(12) United States Patent
Bae et al.

(10) Patent No.: US 10,903,470 B2
(45) Date of Patent: Jan. 26, 2021

(54) BATTERY PACK

(71) Applicant: Samsung SDI Co., Ltd., Yongin-si (KR)

(72) Inventors: Jangwoong Bae, Yongin-si (KR); Shidong Park, Yongin-si (KR); Jisoon Lim, Yongin-si (KR); Eungi Heo, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 108 days.

(21) Appl. No.: 16/230,921

(22) Filed: Dec. 21, 2018

(65) Prior Publication Data
US 2019/0198845 A1 Jun. 27, 2019

(30) Foreign Application Priority Data

Dec. 27, 2017 (KR) .................. 10-2017-0181515

(51) Int. Cl.
*H01M 2/20* (2006.01)
*H01M 2/10* (2006.01)
(Continued)

(52) U.S. Cl.
CPC ......... *H01M 2/206* (2013.01); *H01M 2/0473* (2013.01); *H01M 2/1077* (2013.01);
(Continued)

(58) Field of Classification Search
CPC ........... H01M 10/4207; H01M 10/441; H01M 2220/20; H01M 2/0473; H01M 2/1077;
(Continued)

(56) References Cited

U.S. PATENT DOCUMENTS 8,632,905 B2 1/2014 Yasui et al.
10,044,019 B2 8/2018 Han
(Continued)

FOREIGN PATENT DOCUMENTS

CN 105576299 A 5/2016
JP 3906706 B2 1/2007
(Continued)

OTHER PUBLICATIONS

International Search Report for corresponding International Application No. PCT/KR2018/013365, dated Feb. 12, 2019, 9 pages.

*Primary Examiner* — Carlos Barcena
(74) *Attorney, Agent, or Firm* — Lewis Roca Rothgerber Christie LLP (57) ABSTRACT

A battery pack includes: a plurality of parallel modules arranged in an arrangement direction; and a bus bar through which different polarities of parallel modules of the plurality of parallel modules that are not adjacent to each other in the arrangement direction are connected in series to each other. In the battery pack, output terminals having different polarities are provided at adjacent positions. Therefore, the battery pack may be easily electrically connected to a set device. In addition, since the electrical paths of the output terminals are shortened, the battery pack may have improved electrical output power and spatial efficiency by a simple structure, and may be durable against vibrations and shocks.

18 Claims, 8 Drawing Sheets

(51) Int. Cl.
    *H01M 2/24*     (2006.01)
    *H01M 2/26*     (2006.01)
    *H01M 2/30*     (2006.01)
    *H01M 10/42*     (2006.01)
    *H01M 10/44*     (2006.01)
    *H01M 2/04*     (2006.01)

(52) U.S. Cl.
    CPC ............. *H01M 2/24* (2013.01); *H01M 2/266* (2013.01); *H01M 2/30* (2013.01); *H01M 10/4207* (2013.01); *H01M 10/441* (2013.01); *H01M 2220/20* (2013.01)

(58) Field of Classification Search
    CPC ........ H01M 2/206; H01M 2/24; H01M 2/266; H01M 2/30
    USPC ........................................ 429/123
    See application file for complete search history.

(56) References Cited

U.S. PATENT DOCUMENTS

| | | | | |
|---|---|---|---|---|
| 2002/0195990 | A1* | 12/2002 | Yang | H01M 2/266 320/107 |
| 2010/0009251 | A1* | 1/2010 | Shin | H01M 2/206 429/158 |
| 2010/0266887 | A1 | 10/2010 | Sekino et al. | |
| 2017/0237057 | A1* | 8/2017 | Tsuruta | H01M 2/206 429/158 |
| 2019/0020011 | A1* | 1/2019 | Yamanaka | H01M 2/34 |

FOREIGN PATENT DOCUMENTS

| | | |
|---|---|---|
| JP | 2017-69072 A | 4/2017 |
| KR | 10-2010-0055477 A | 5/2010 |
| KR | 10-2012-0097486 A | 9/2012 |
| KR | 10-2015-0086841 A | 7/2015 |
| KR | 10-2017-0042113 A | 4/2017 |

* cited by examiner

BATTERY PACK

CROSS-REFERENCE TO RELATED APPLICATION

This application claims priority to and the benefit of Korean Patent Application No. 10-2017-0181515, filed on Dec. 27, 2017 in the Korean Intellectual Property Office, the entire disclosure of which is incorporated herein by reference.

BACKGROUND

1. Field

Aspects of one or more embodiments relate to a battery pack.

2. Description of the Related Art

In general, secondary batteries are rechargeable, unlike non-rechargeable primary batteries. Secondary batteries are used as energy sources of a number of devices, such as mobile devices, electric vehicles, hybrid vehicles, electric bicycles, or uninterruptible power supplies. Secondary batteries are individually used or secondary battery modules (packs) each including a plurality of secondary batteries connected as a unit are used according to the types of external devices using secondary batteries.

Unlike small mobile devices, such as cellular phones, each operable for a certain period of time using a single battery, devices such as electric vehicles or hybrid vehicles having long operation times and consuming large amounts of electricity may more suitably use battery modules (packs), each including a plurality of batteries (battery cells), to handle problems relating to power and capacity, and the output voltages or currents of battery modules may be increased by adjusting the number of batteries included in each battery module.

SUMMARY

According to an aspect of one or more embodiments, a battery pack in which output terminals having different polarities are provided at adjacent positions for ease of electrical connection with a device (e.g., a set device) is provided.

According to an aspect of one or more embodiments, a battery pack in which electrical paths of output terminals are shortened such that the battery pack may have improved electrical output power and spatial efficiency by a simple structure and may be durable against vibrations and shocks is provided.

Additional aspects will be set forth, in part, in the description which follows and, in part, will be apparent from the description, or may be learned by practice of the presented embodiments.

According to one or more embodiments, a battery pack includes: a plurality of parallel modules arranged in an arrangement direction; and a bus bar through which different polarities of parallel modules that are not adjacent to each other in the arrangement direction of the parallel modules are connected in series to each other.

The bus bar may connect the parallel modules that are alternately spaced apart from each other so as not to be adjacent to each other in the arrangement direction.

The bus bar may include a plurality of bus bars each connecting a pair of parallel modules of the plurality of parallel modules that are alternately spaced apart from each other in the arrangement direction.

Each of the parallel modules may include battery cells of which electrodes of the same polarity are connected in parallel to each other.

The electrodes of the same polarity of the battery cells included in each of the parallel modules may be connected in parallel to each other through the bus bar, and electrodes of different polarities of different parallel modules of the plurality of parallel modules may be connected in series to each other through the bus bar.

The bus bar may connect a front parallel module and a rear parallel module in the arrangement direction, wherein the bus bar may include: a group of front branches respectively forming contacts with the battery cells of the front parallel module; a group of rear branches respectively forming contacts with the battery cells of the rear parallel module; and a connection portion unidirectionally extending in the arrangement direction while connecting the group of front branches respectively to the group of rear branches.

The plurality of parallel modules may include first, second, . . . , (n−2)th, (n−1)th, nth, (n+1)th, (n+2)th, . . . , (m−1)th, and mth parallel modules in the arrangement direction, wherein the bus bar may include: a front bus bar connecting the (n−2)th parallel module and the nth parallel module to each other; and a rear bus bar connecting the (n−1)th parallel module and the (n+1)th parallel module to each other.

The front bus bar and the rear bus bar may have a comb structure to engage with each other.

The front bus bar may include a connection portion extending in the arrangement direction and pairs of branches protruding from the connection portion to form contacts with the (n−2)th parallel module and the nth parallel module; the rear bus bar may include a connection portion extending in the arrangement direction and pairs of branches protruding from the connection portion to form contacts with the (n−1)th parallel module and the (n+1)th parallel module; and the pairs of branches of the front bus bar and the pairs of branches of the rear bus bar may have a comb structure to engage with each other.

The parallel modules may have different polarities arranged in a left-right direction, and alternately arranged parallel modules connected through the bus bar may be arranged in a left-right reverse pattern such that opposite polarities of the alternately arranged parallel modules may face each other.

The parallel modules may be arranged in the arrangement direction in a left-right reverse pattern in such a manner that every pair of the plurality of parallel modules adjacent to each other in the arrangement direction is left-right reversed relative to adjacent pairs of the plurality of parallel modules.

A pair of parallel modules of the plurality of parallel modules in the arrangement direction may be arranged without left-right reversal, and the pair of parallel modules and another pair of parallel modules of the plurality of parallel modules adjacent to the pair of parallel modules may be left-right reversed relative to each other.

The battery pack may further include first and second output terminals having different polarities, both the first and second output terminals extending outward from one of a front end portion and a rear end portion of the battery pack in the arrangement direction.

The plurality of parallel modules may include first, second, . . . , (m−1)th, and mth parallel modules in the arrangement direction, and the first and second output terminals may extend outward from the first and second parallel modules.

The battery pack may further include first and second terminal connection members unidirectionally extending in the arrangement direction to connect the first and second output terminals respectively to the first and second parallel modules.

The first and second parallel modules from which the first and second output terminals extend outward may be arranged without left-right reversal such that electrodes of the same polarity of the first and second parallel modules may face each other.

The plurality of parallel modules may include first, second, . . . , (m−1)th, and mth parallel modules in the arrangement direction, and different polarities of the mth parallel module and the (m−1)th parallel module may be connected in series to each other through a cross connection member extending in a diagonal direction.

The (m−1)th parallel module and the mth parallel module connected to each other through the cross connection member may be arranged without left-right reversal such that electrodes of the same polarity of the (m−1)th parallel module and the mth parallel module may face each other.

The parallel modules may have different polarities arranged in a left-right direction, and the cross connection member may extend in the diagonal direction following both the arrangement direction and the left-right direction.

According to one or more embodiments, a battery pack includes: a plurality of battery cells arranged in an arrangement direction; and a bus bar through which different polarities of battery cells that are alternately spaced apart from each other so as not to be adjacent to each other in the arrangement direction are connected in series to each other.

BRIEF DESCRIPTION OF THE DRAWINGS

These and/or other aspects will become more apparent and more readily appreciated from the following description of some embodiments, taken in conjunction with the accompanying drawings in which.

DETAILED DESCRIPTION

Reference will now be made in further detail to some embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. In the drawings, the relative sizes of elements, layers, and regions may be exaggerated for clarity.

It is to be understood that, although the terms "first," "second," "third," etc., may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section described below could be termed a second element, component, region, layer, or section, without departing from the spirit and scope of the present invention.

Spatially relative terms, such as "lower," "upper," and the like, may be used herein for ease of explanation to describe one element or feature's relationship to another element(s) or feature(s) as illustrated in the figures. It is to be understood that the spatially relative terms are intended to encompass different orientations of the device in use or in operation, in addition to the orientation depicted in the figures. For example, if the device in the figures is turned over, elements described as being "lower" relative to other elements or features would then be oriented as "upper" relative to the other elements or features. Thus, the example terms "lower" and "upper" can encompass both an orientation of above and below. The device may be otherwise oriented (e.g., rotated 90 degrees or at other orientations) and the spatially relative descriptors used herein should be interpreted accordingly.

It is to be understood that when an element or layer is referred to as being "on," "connected to," or "coupled to" another element or layer, it can be directly on, connected to, or coupled to the other element or layer, or one or more intervening elements or layers may be present. In addition, it is also to be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present invention. As used herein, the singular forms "a" and "an" are intended to include the plural forms as well, unless the context clearly indicates otherwise. It is to be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

Unless otherwise defined, all terms (including technical and scientific terms) used herein have the same meaning as commonly understood by one of ordinary skill in the art to which the present invention belongs. It is to be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Battery packs will now be described with reference to the accompanying drawings, in which some embodiments are shown.

Figure 1:
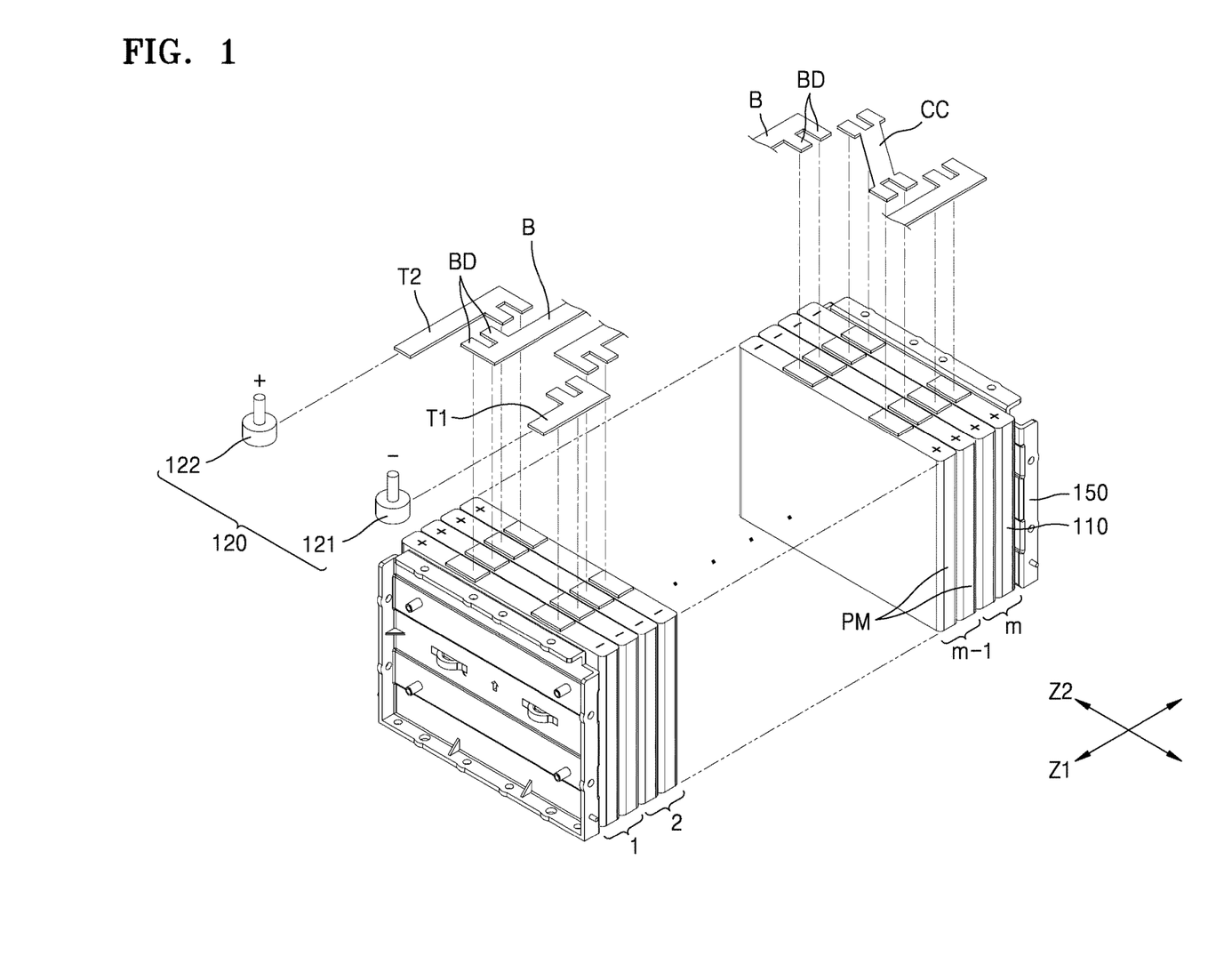
FIG. 1 is a perspective view illustrating a battery pack according to an embodiment.

FIG. 1 is a perspective view illustrating a battery pack according to an embodiment.

Referring to FIG. 1, the battery pack may include a plurality of parallel modules PM arranged in a direction (corresponding to a front-back direction Z1). For example, the battery pack of the present embodiment may include a plurality of parallel modules PM, i.e., first, second, . . . , (m−1)th, and mth parallel modules PM arranged in the front-back direction Z1. Here, each of the parallel modules PM may include one or more battery cells 110 of which electrodes of the same polarity are connected in parallel. In an embodiment, one parallel module PM may refer to two or more battery cells 110 that are placed adjacent to each other and are connected in parallel. Further, in another embodiment, one parallel module PM may refer to one battery cell 110. That is, in an embodiment, a parallel module PM may have a single battery cell 110, and, in this sense, the parallel module PM may not have parallel connection between two or more battery cells 110.

For example, the battery pack of the present embodiment may be attached to a device (e.g., a set device) (not shown) to provide driving power and may include parallel modules PM each including two or more adjacent battery cells 110 that are connected in parallel to each other to provide high-capacity, high-current output power according to an output power level required by the set device. The two or more battery cells 110 of which electrodes of the same polarity are connected in parallel may provide high-current output power compared to a single battery cell 110, and like a single more battery cell 110, the two or more battery cells 110 may have a common negative electrode and a common positive electrode because electrodes of the same polarity of the two or more battery cells 110 are connected in parallel.

The battery pack of the present embodiment may include a plurality of parallel modules PM arranged in a row in the front-back direction Z1 or a plurality of battery cells 110 arranged in a row in the front-back direction Z1. The technical matters of the battery pack of the present embodiment described below may be applied to a plurality of parallel modules PM arranged in a row in the front-back direction Z1 or a plurality of battery cells 110 arranged in a row in the front-back direction Z1.

Since each of the parallel modules PM constituting the battery pack includes one or more battery cells 110 arranged in the front-back direction Z1, the plurality of parallel modules PM of the battery pack arranged in a row in the front-back direction Z1 may correspond to a plurality of battery cells 110 arranged in a row in the front-back direction Z1, and the arrangement direction of the parallel modules PM and the arrangement direction of the battery cells 110 may correspond to the front-back direction Z1 and may be collectively referred to as an arrangement direction of the parallel modules PM or the battery cells 110. Here, the arrangement direction of the parallel modules PM or the battery cells 110 may be the same as the front-back direction Z1.

A pair of end plates 150 may be placed on both front and rear ends of the battery pack in the arrangement direction of the parallel modules PM, and the pair of end plates 150 may structurally bind the parallel modules PM placed therebetween.

Figure 2:
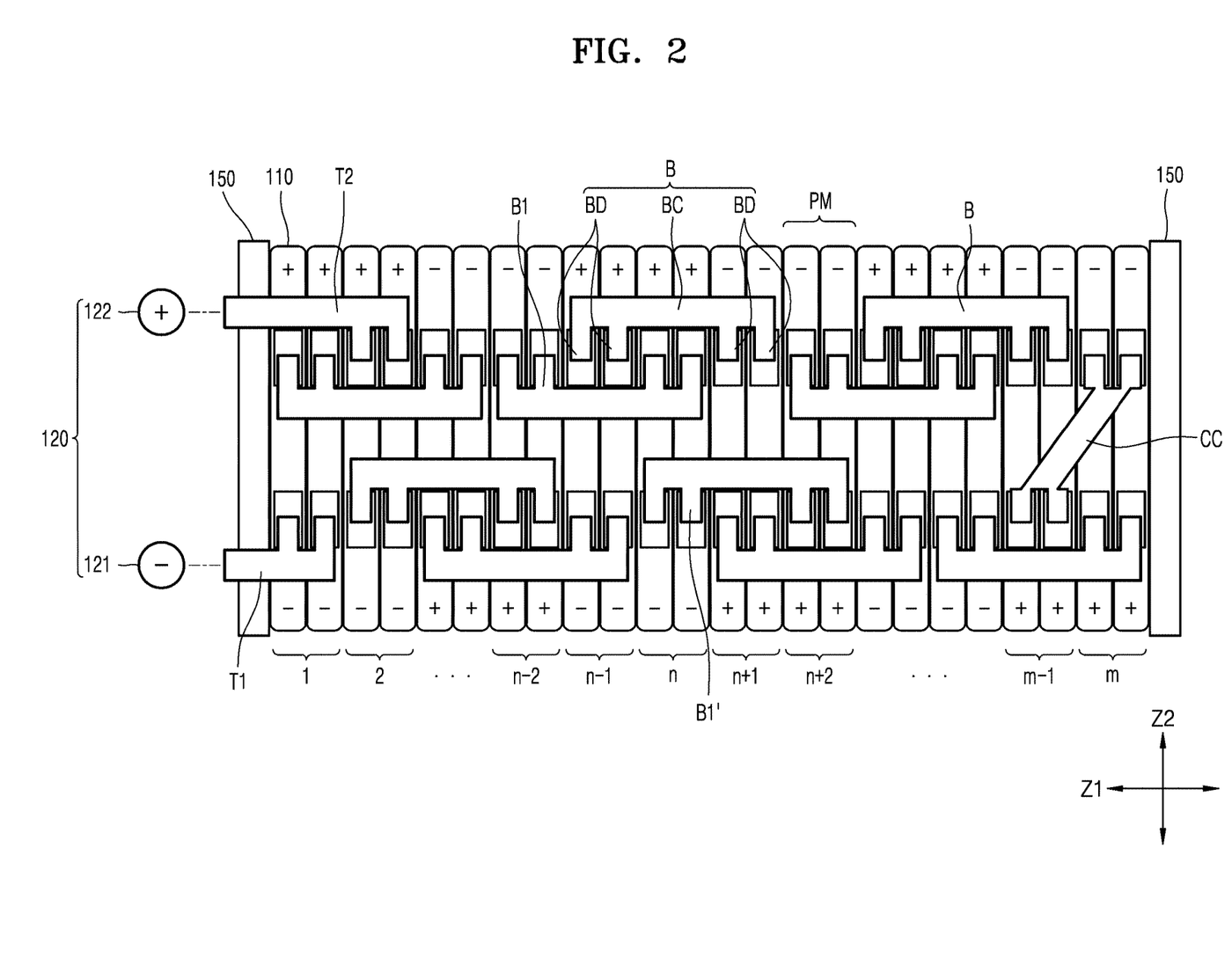
FIG. 2 is a view illustrating electrical connection of the battery pack shown in FIG. 1.
Figure 3:
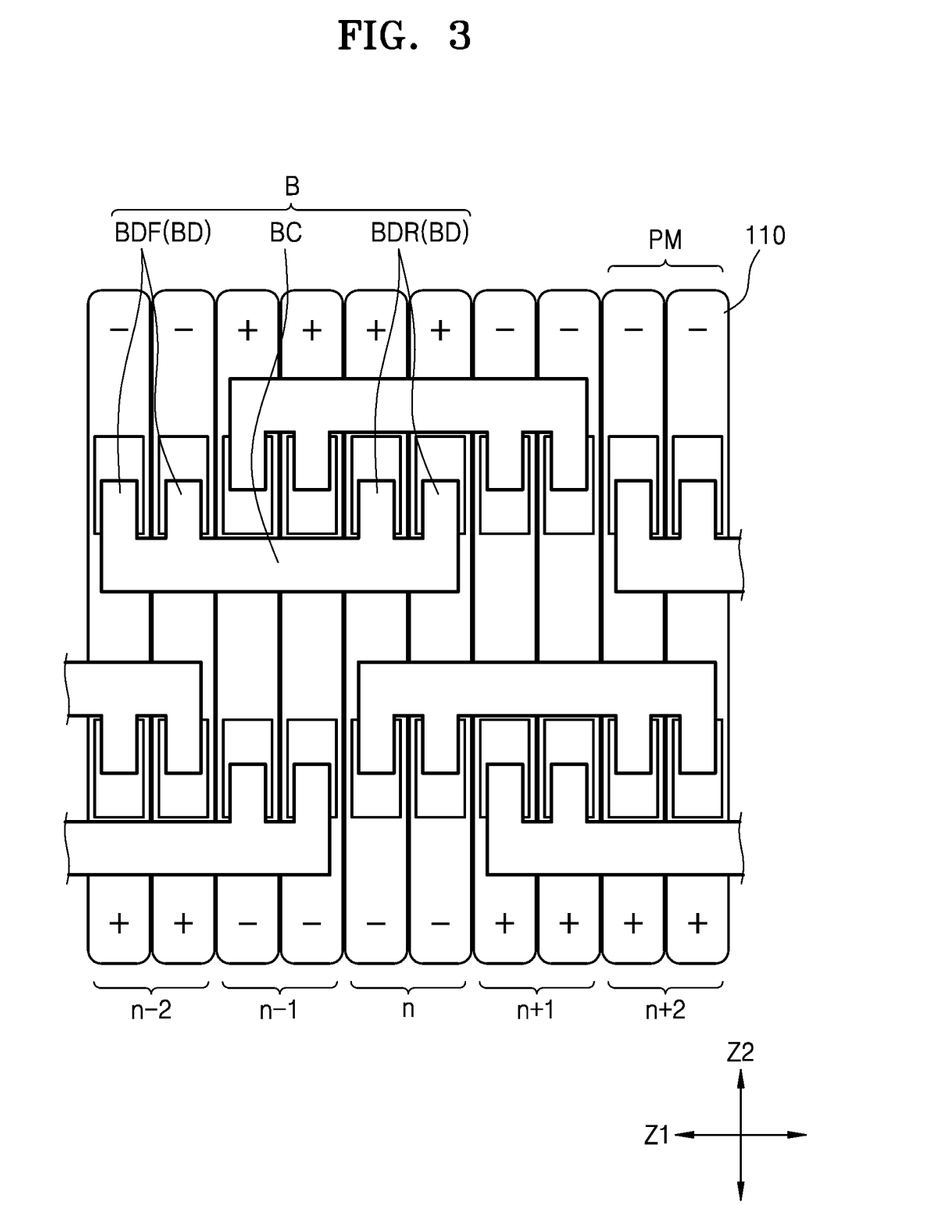
FIG. 3 and FIG. 4 are views illustrating a portion of the battery pack shown in FIG. 2 for explaining a bus bar structure.
Figure 4:
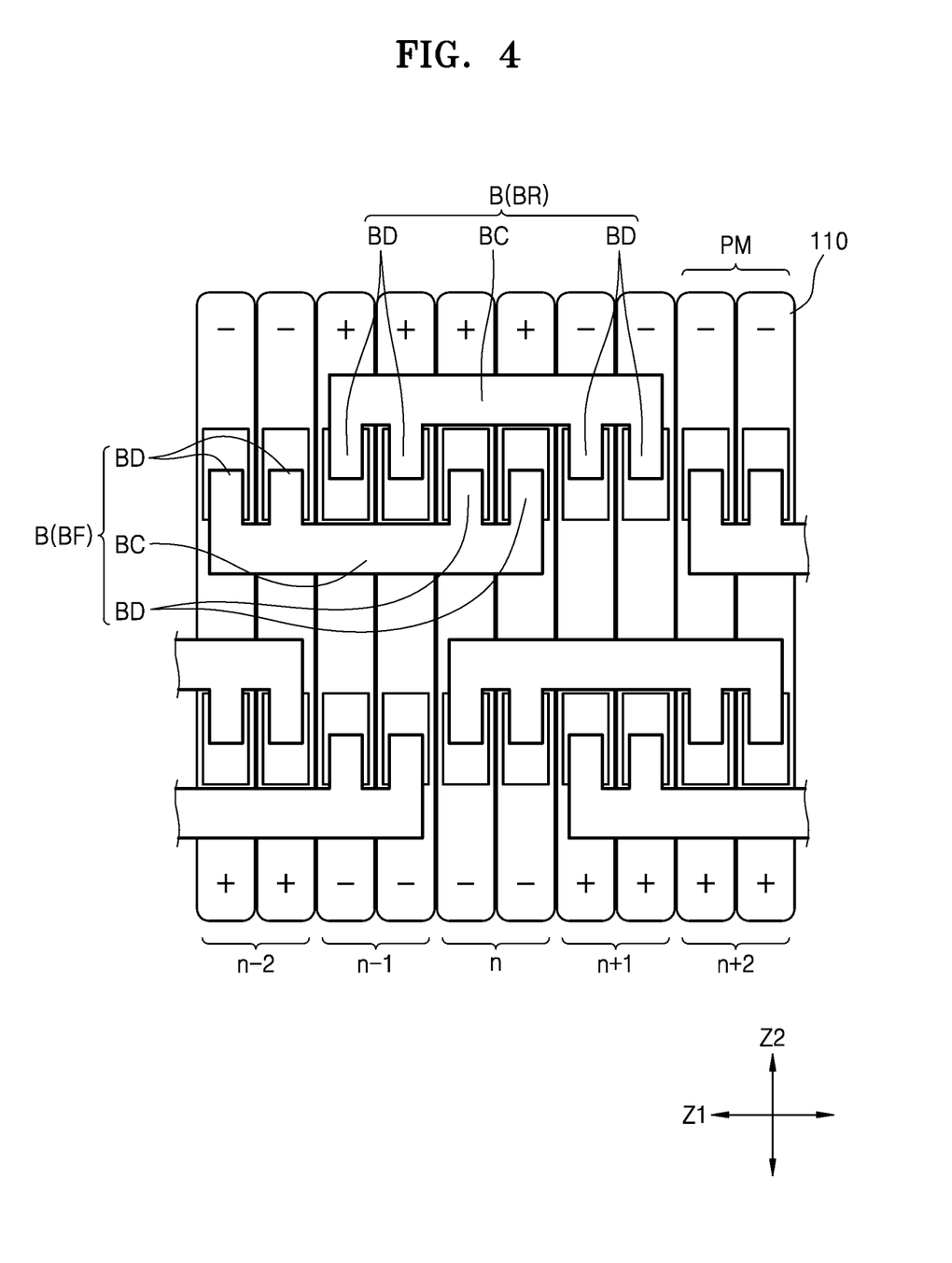

FIG. 2 is a view illustrating electrical connection of the battery pack shown in FIG. 1; and FIG. 3 and FIG. 4 are views illustrating a portion of the battery pack shown in FIG. 2 for explaining a bus bar structure.

Referring to FIG. 2, the battery pack of the present embodiment may include a plurality of parallel modules PM, that is, first, second, . . . , (n−2)th, (n−1)th, nth, (n+1)th, (n+2)th, . . . , (m−1)th, and mth parallel modules PM arranged in the front-back direction Z1. In addition, the battery pack may include bus bars B to electrically connect the parallel modules PM. For example, the bus bars B may connect electrodes of opposite polarities of the parallel modules PM in series to each other. As described later herein, the bus bars B may electrically connect different parallel modules PM arranged alternately so as not to be adjacent to each other. For example, a plurality of bus bars B may be provided, and each of the bus bars B may connect a pair of parallel modules PM which are alternately spaced apart from each other in the arrangement direction (front-back direction Z1) of the parallel modules PM. This will be further described later herein.

When each of the parallel modules PM includes two or more different battery cells 110, electrodes of the same polarity of battery cells 110 included in each parallel module PM may be connected in parallel by the bus bars B. That is, the bus bars B may connect the parallel modules PM in series to each other while connecting the battery cells 110 included in each of the parallel module PM in parallel to each other.

Referring to FIG. 3, each of the bus bars B includes: a connection portion BC extending in the arrangement direction (front-back direction Z1) of the parallel modules PM to connect different parallel modules PM; and pairs of branches BD protruding from the connection portion BC to respectively form contacts with the battery cells 110 included in the different parallel modules PM.

For example, a bus bar connecting a front parallel module PM, for example, the (n−2)th parallel module PM, to a rear parallel module PM, for example, the nth parallel module PM in the arrangement direction (front-back direction Z1) of the parallel modules PM may include: a group of front branches BDF to form contacts with a group of battery cells 110 included in the front parallel module PM, for example, the (n−2)th parallel module PM; a group of rear branches BDR to form contacts with a group of battery cells 110 included in the rear parallel module PM, for example, the nth parallel module PM; and a connection portion BC extending in the arrangement direction of the parallel modules PM, that is, in the front-back direction Z1, while connecting the group of front branches BDF and the group of rear branches BDR to each other.

That is, the bus bar B may connect electrodes of the same polarity of the battery cells 110 of the (n−2)th parallel module PM in parallel to each other via the group of front branches BDF and may connect electrodes of the same polarity of the battery cells 110 of the nth parallel module PM in parallel to each other via the group of rear branches BDR. To this end, the connection portion BC may be connected to each of the group of front branches BDF and the group of rear branches BDR. In addition, the connection portion BC of the bus bar B extending in the arrangement direction of the parallel modules PM, that is, the front-back direction Z1, may connect electrodes of different polarities of the front parallel module PM, for example, the (n−2)th parallel module PM and the rear parallel module PM, for example, the nth parallel module PM in series to each other.

Referring to FIG. 2, the battery pack of the present embodiment may include a plurality of parallel modules PM, that is, first, second, . . . , (n−2)th, (n−1)th, nth, (n+1)th, (n+2)th, . . . , (m−1)th, and mth parallel modules PM arranged in the front-back direction Z1. In this case, adjacent battery cells 110 forming a front parallel module, for example, the (n−2)th parallel module PM may be connected in parallel to each other via the front branches BDF respectively connected to the battery cells 110 and a front end portion of the connection portion BC connecting the front branches BDF. Similarly, adjacent battery cells 110 forming a rear parallel module PM, for example, the nth parallel module PM may be connected in parallel to each other via the rear branches BDR respectively connected to the battery cells 110 and a rear end portion of the connection portion BC connecting the rear branches BDR.

The front end portion of the connection portion BC connected to the front parallel module PM, for example, the (n−2)th parallel module, and the rear end portion of the connection portion BC connected to the rear parallel module PM, for example, the nth parallel module, are connected to each other through the connecting portion BC extending in the arrangement direction of the parallel modules PM such that electrodes of different polarities of the front parallel module PM, for example, the (n−2)th parallel module PM, and the rear parallel module PM, for example, the nth parallel module PM, may be connected in series to each other. The series connection between the front parallel module PM, for example, the (n−2)th parallel module, and the rear parallel module PM, for example, the nth parallel module PM, which are not adjacent to each other, will be described further below.

Referring to FIG. 2, the battery pack of the present embodiment may include series connection between parallel modules PM that are not adjacent to each other in the front-back direction Z1 in which the parallel modules PM are arranged. Here, the expression "parallel modules PM are not adjacent to each other in the front-back direction Z1" may mean that one parallel module PM is not directly ahead of another parallel module PM in the front-back direction Z1. In a battery pack of a comparative example for comparison with the present disclosure, parallel modules PM adjacent to each other in the front-back direction Z1, that is, parallel modules PM arranged next to each other in the front-back direction Z1, are connected in series to each other. In the battery pack of the present embodiment, however, parallel modules PM that are not adjacent to each other in the front-back direction Z1, that is, parallel modules PM that are not arranged next to each other, but are apart from each other, in the front-back direction Z1, are connected in series to each other. For example, in an embodiment, a pair of parallel modules PM connected in series to each other may be spaced apart from each other with another parallel module PM therebetween.

Referring to FIG. 2, the battery pack of the present embodiment may include a plurality of parallel modules PM, that is, first, second, . . . , (n−2)th, (n−1)th, nth, (n+1)th, (n+2)th, . . . , (m−1)th, and mth parallel modules PM arranged in the front-back direction Z1, and, in this case, the nth parallel module PM is not connected to the (n−1)th parallel module PM which is directly ahead of the nth parallel module PM. Similarly, the nth parallel module is not connected to the (n+1)th parallel module PM which is directly behind the nth parallel module PM.

In the forward direction, the nth parallel module PM is connected to the (n−2)th parallel module with the (n−1)th parallel module PM therebetween. That is, the nth parallel module is electrically connected through a bus bar B1 (refer to FIG. 2) to the (n−2)th parallel module PM which is spaced apart from the nth parallel module PM in the forward direction. In the backward direction, the nth parallel module PM is connected to the (n+2)th parallel module with the (n+1)th parallel module PM therebetween. That is, the nth parallel module is electrically connected through a bus bar B1' (refer to FIG. 2) to the (n+2)th parallel module PM which is spaced apart from the nth parallel module PM in the backward direction.

For example, the nth parallel module is connected in series to the (n−2)th parallel module PM in the forward direction by connecting electrodes of opposite polarities to each other, and is connected in series to the (n+2)th parallel module PM in the backward direction by connecting electrodes of opposite polarities to each other.

All of the parallel modules PM or the battery cells 110 of the battery pack of the present embodiment are cooperatively electrically connected to each other to provide a required output capacity. The expression "adjacent parallel modules PM are not electrically connected to each other" may not mean that the adjacent parallel modules PM are electrically disconnected from each other but may mean that the adjacent parallel modules PM are not directly connected to each other through a bus bar B. For example, in the present embodiment, adjacent parallel modules PM are not directly connected to each other through a bus bar B.

Referring to FIG. 4, in the nth parallel module PM and the (n+1)th parallel module PM that are adjacent to each other, a front bus bar BF connected to the nth parallel module PM and a rear bus bar BR connected to the (n+1)th parallel module PM are different bus bars that are spaced apart from each other and have no contact therebetween. In this case, the front bus bar BF connected to the nth parallel module PM and the rear bus bar BR connected to the (n+1)th parallel module PM may engage (or align) with each other in a comb structure.

For example, the front bus bar BF connected to the nth parallel module PM may include: a connection portion BC extending in the arrangement direction (front-back direction Z1) of the parallel modules PM; and pairs of branches BD protruding from the connection portion BC to form contacts with the (n−2)th parallel module PM and the nth parallel module PM. In addition, the rear bus bar BR connected to the (n+1)th parallel module PM may include: a connection portion BC extending in the arrangement direction (front-back direction Z1) of the parallel modules PM; and pairs of branches BD protruding from the connection portion BC to form contacts with the (n−1)th parallel module PM and the (n+1)th parallel module PM. In this case, the pairs of branches BD of the front bus bar BF and the pairs of branches BD of the rear bus bar BR may engage with each other in a comb structure.

As described above, in the nth parallel module PM and the (n+1)th parallel module PM that are adjacent to each other, the front bus bar BF connected to the nth parallel module PM and the rear bus bar BR connected to the (n+1)th parallel module PM are different bus bars that are spaced apart from each other and have no contact therebetween. Further, in the (n−1)th parallel module PM and the nth parallel module PM that are adjacent to each other, the rear bus bar BR connected to the (n−1)th parallel module PM and the front bus bar BF connected to the nth parallel module PM are different bus bars that are spaced apart from each other and have no contact therebetween. In this case, the rear bus bar BR connected to the (n−1)th parallel module PM and the front bus bar BF connected to the nth parallel module PM may engage with each other in a comb structure.

The (n−1)th parallel module PM and the (n+1)th parallel module PM are spaced apart from each other with the nth parallel module PM therebetween and are connected in series to each other through the rear bus bar BR. In addition, the rear bus bar BR connecting the (n−1)th parallel module PM and the (n+1)th parallel module PM to each other may have a comb structure to engage with the front bus bar BF connected to the nth parallel module PM.

Referring to FIG. 2, the battery pack of the present embodiment has series connection between parallel modules PM that are alternately spaced apart from each other so as not to be adjacent to each other. To form this series connection, alternately spaced parallel modules PM may be arranged in a pattern in which the parallel modules PM are reversed in a left-right direction Z2 such that opposite polarities thereof may face each other. For example, the nth parallel module PM and the (n−2)th parallel module PM that are connected in series to each other through the bus bar B1 (refer to FIG. 2) are reversed in the left-right direction Z2 such that opposite polarities thereof may face each other, and the nth parallel module PM and the (n+2)th parallel module PM that are connected in series to each other through the bus bar B1' (refer to FIG. 2) are reversed in the left-right direction Z2 such that opposite polarities thereof may face each other. In this specification, the left-right direction Z2 may be a direction in which negative (−) and positive (+) electrodes that are opposite each other in a parallel module PM are arranged, and in which negative (−) and positive (+) electrodes that are opposite each other in each battery cell 110 of a parallel module PM are arranged. For example, the left-right direction Z2 in which different polarities are arranged in a parallel module PM or in each battery cell 110 of a parallel module PM may be perpendicular to the arrangement direction of the parallel modules PM (corresponding to the front-back direction Z1).

As described above, to form a reverse pattern in which the parallel modules PM are alternately arranged in the front-back direction Z1 with left-right reverse orientations, left-right reversal in the left-right direction Z2 may occur at every two parallel modules PM adjacent to each other in the front-back direction Z1. That is, a pair of two adjacent parallel modules PM is arranged without left-right reversal, and another pair of two adjacent parallel modules PM is arranged with left-right reversal relative to the pair of two adjacent parallel modules PM. In other words, a pair of parallel modules PM adjacent to each other in the arrangement direction (front-back direction Z1) of the parallel modules PM may be arranged without left-right reversal, and another pair of parallel modules PM adjacent to each other in the arrangement direction may be left-right reversed relative to the pair of parallel modules PM.

Referring to FIG. 2, the pair of the nth parallel module PM and the (n−1)th parallel module PM adjacent to each other are arranged without left-right reversal such that electrodes of the same polarity may face each other, and the pair of the (n+1)th parallel module PM and the (n+2)th parallel module PM adjacent to each other are arranged without left-right reversal such that electrodes of the same polarity may face each other. In this case, the pair of nth parallel module PM and the (n−1)th parallel module PM adjacent to each other are left-right reversed relative to the pair of the (n+1)th parallel module PM and the (n+2)th parallel module PM adjacent to each other. As described above, left-right reversal in the left-right direction Z2 occurs at every pair of two parallel modules PM adjacent to each other in the front-back direction Z1 such that opposite polarities of parallel modules PM which are alternately arranged and are not adjacent to each other may face each other, and since parallel modules PM alternately arranged and are not adjacent to each other are connected through bus bars B that extend in a direction, that is, the front-back direction Z1 in which the parallel modules PM are arranged, series connection may be easily realized.

The battery pack of the present embodiment includes series connection between parallel modules PM that are alternately arranged and are not adjacent to each other such that output terminals 120 of the battery pack may easily extend outward from a side of the battery pack with a simple structure.

For example, the output terminals 120 may include first and second output terminals 121 and 122 having different polarities, and both the first and second output terminals 121 and 122 may extend outward from one of a front end portion and a rear end portion of the battery pack in the front-back direction Z1 in which the parallel modules PM are arranged. For example, the first and second output terminals 121 and 122 may extend outward from one of the front end portion and the rear end portion of the battery pack in the front-back direction Z1 in which the parallel modules PM are arranged, but do not extend respectively from the front end portion and the rear end portion of the battery pack.

The battery pack of the present embodiment may include a plurality of parallel modules PM, that is, first, second, . . . , (n−2)th, (n−1)th, nth, (n+1)th, (n+2)th, . . . , (m−1)th, and mth parallel modules PM arranged in the front-back direction Z1, and, in this case, the output terminals 120 may extend outward from the first and second parallel modules PM, respectively. That is, since the output terminals 120 extend outward from two parallel modules PM adjacent to each other at the front end portion of the battery pack, that is, from the first and second parallel modules PM, the pair of first and second output terminals 121 and 122 may be adjacent to each other at the front side of the battery pack, and this structure may facilitate electrical connection between the battery pack and a device (e.g., a set device) (not shown) to which the battery pack is attached. Since the output terminals 120 extend outward from the two parallel modules PM adjacent to each other at the front end portion of the battery pack, that is, from the first and second parallel modules PM, electrical paths for forming the output terminals 120 may be shortened.

Referring to FIG. 2, the pair of first and second output terminals 121 and 122 having opposite polarities may be arranged at the front side of the battery pack, and first and second terminal connection members T1 and T2 may be arranged at the front side of the battery pack to connect the first and second output terminals 121 and 122 to the first and second parallel modules PM, respectively. For example, the first and second terminal connection members T1 and T2 may electrically connect the pair of first and second output terminals 121 and 122 arranged at the front side of the battery pack to the first and second parallel modules PM adjacent to each other.

The first and second parallel modules PM adjacent to each other at the front end portion of the battery pack may be arranged without left-right reversal such that the first and second output terminals 121 and 122 having opposite polarities may be placed at opposite left and right sides without polarity interference. For example, the first output terminal 121 may be placed at a relatively left side, and the second output terminal 122 may be placed at a relatively right side. Therefore, since the first and second output terminals 121 and 122 are arranged at opposite left and right sides, electrical crosstalk or interference between different polarities may be prevented or substantially prevented.

The first parallel module PM connected to the first output terminal 121 and the second parallel module PM connected to the second output terminal 122 may be arranged without left-right reversal to place the first and second output terminals 121 and 122 at left and right positions which are isolated from each other, and, for example, different polarities (e.g., negative and positive electrodes) of the first and second parallel modules PM may be arranged in the left-right direction Z2.

As described above, since the first and second output terminals 121 and 122, and different polarities (e.g., negative and positive electrodes) of the first and second parallel modules PM connected to the first and second output terminals 121 and 122 are arranged at the left and right sides, the first and second output terminals 121 and 122 and the first and second parallel modules PM may be easily electrically connected to each other via the pair of first and second terminal connection members T1 and T2 that simply unidirectionally extend in the front-back direction Z1 from the different polarities of the first and second parallel modules PM (e.g., negative and positive electrodes).

That is, due to the pair of first and second terminal connection members T1 and T2 simply unidirectionally extending in the front-back direction Z1 from the different polarities of the first and second parallel modules PM (e.g., negative and positive electrodes), the pair of first and second output terminals 121 and 122 may be placed at the left and right positions isolated from each other.

Figure 5:
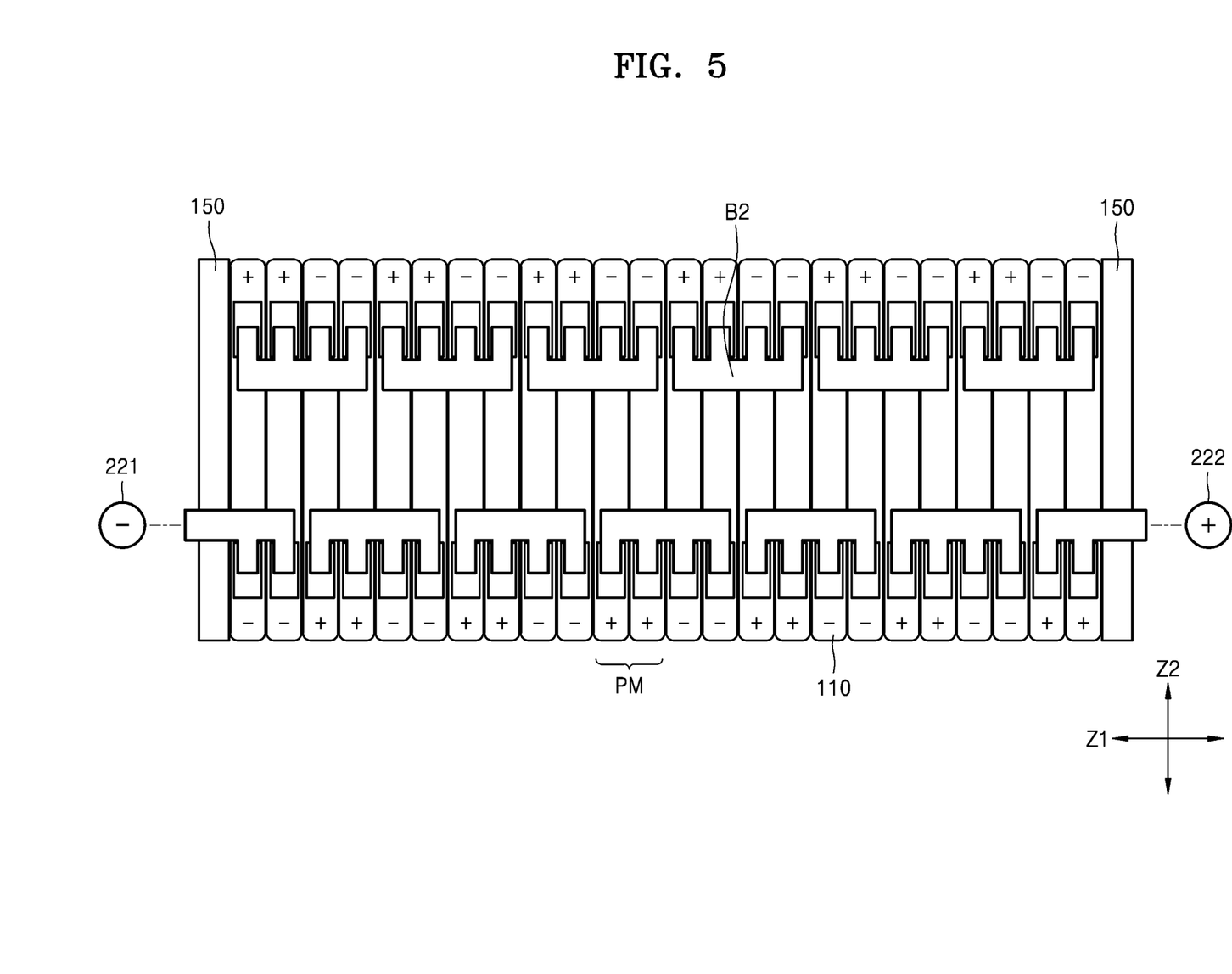
FIG. 5 is a view illustrating a structure of a battery pack according to a first comparative example for comparison with the present disclosure.

FIG. 5 is a view illustrating a structure of a battery pack according to a first comparative example for comparison with the present disclosure. In the first comparative example shown in FIG. 5, parallel modules PM adjacent to each other in a front-back direction Z1 are connected in series to each other through bus bars B2. In the structure according to the first comparative example, first and second output terminals 221 and 222 of the battery pack extend outward respectively from opposite front and rear sides of the battery pack. Thus, it is difficult to connect the battery pack to a device (e.g., a set device) (not shown) in which the battery pack will be installed.

Figure 6:
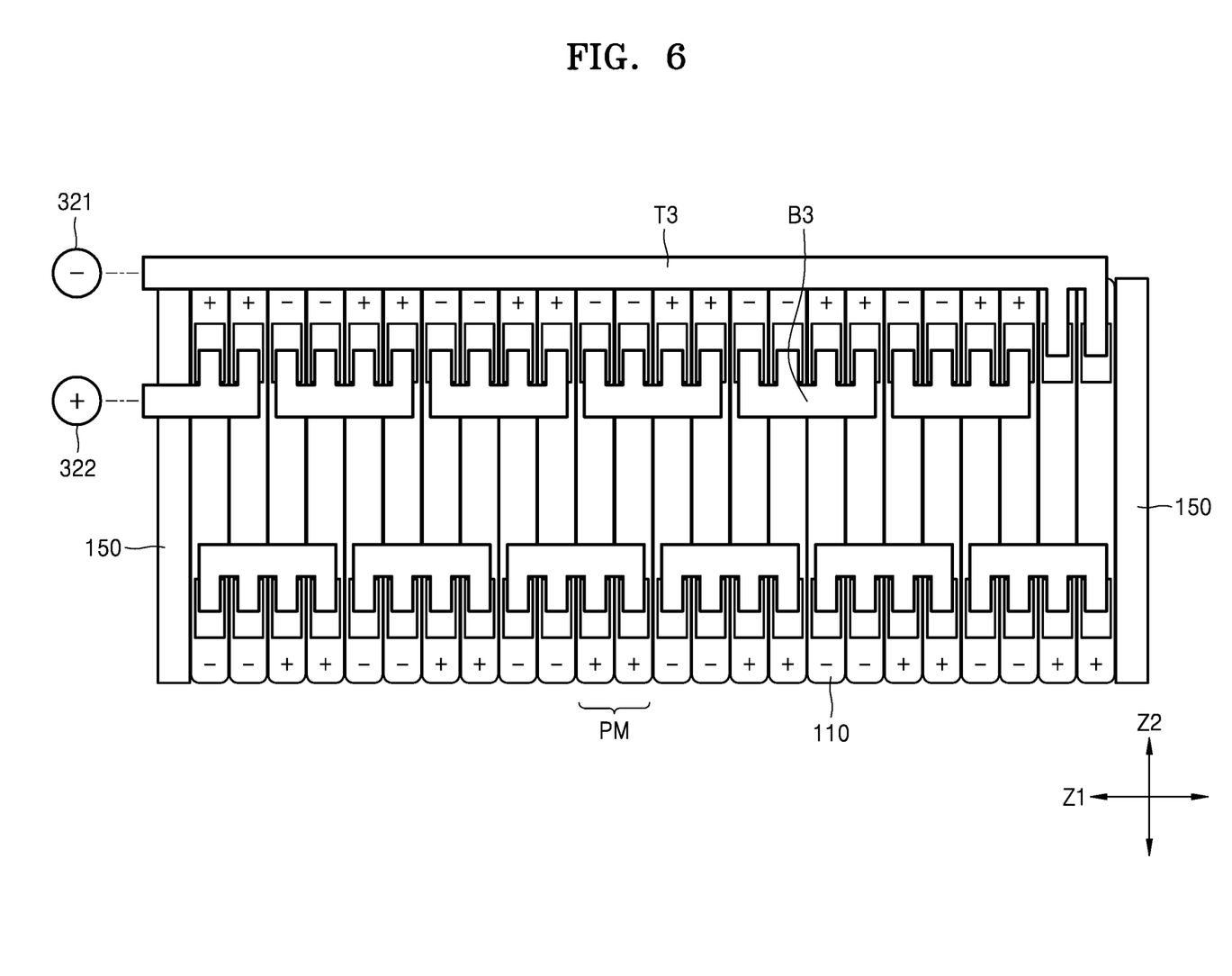
FIG. 6 is a view illustrating a structure of a battery pack according to a second comparative example for comparison with the present disclosure.

FIG. 6 is a view illustrating a structure of a battery pack according to a second comparative example for comparison with the present disclosure. The second comparative example shown in FIG. 6 also includes series connection between parallel modules PM adjacent to each other in a front-back direction Z1. In the second comparative example, a terminal connection member T3 extends across the length of the battery pack from a rearmost parallel module PM to a front side of the battery pack to place first and second output terminals 321 and 322 of the battery pack at the front side of the battery pack. The terminal connection member T3 extending across the length of the battery pack elongates the electrical path of the first output terminal 321 to cause output power loss according to electrical resistance, and because of difficulty in fixing and insulating the terminal connection member T3 extending across the length of the battery pack, the terminal connection member T3 may complicate the entire structure of the battery pack, make the battery pack vulnerable to vibrations and shocks, and cause defects of the battery pack. In the second comparative example, the parallel modules PM adjacent to each other in the front-back direction Z1 are also connected in series to each other through bus bars B3.

In the battery pack of the embodiment shown in FIG. 2, the first and second output terminals 121 and 122 extend outward from the two parallel modules PM adjacent to each other at the front end portion of the battery pack, i.e., from the first and second parallel modules PM. Thus, the battery pack may be easily electrically connected to a device (e.g., a set device) (not shown) in which the battery pack will be installed, and electrical paths for forming the output terminals 120 are shortened such that the first and second terminal connection members T1 and T2 may be simply fixed and insulated, and the battery pack may be durable against vibrations and shocks. In addition, since the first and second terminal connection members T1 and T2 have short paths and are fixed and insulated by a simple structure, the battery pack may have improved spatial efficiency and a compact structure compared to other battery packs having the same energy density.

Since the pair of first and second output terminals 121 and 122 are both placed at the front side of the battery pack, a cross connection member CC may be placed at a rear side of the battery pack to reverse an electrical path. Parallel modules PM adjacent to each other at the rear side of the battery pack may be connected in series to each other through the cross connection member CC. The battery pack of the present disclosure may include: series connection between parallel modules PM alternately arranged so as not to be adjacent to each other in a direction from the front side to the rear side of the battery pack; and series connection between rearmost parallel modules PM, that is, the (m−1)th parallel module PM and the mth parallel module PM to reverse the electrical path toward the front side of the battery pack at which the output terminals 120 are arranged. For example, connection between parallel modules PM alternately arranged so as not to be adjacent to each other may be made via bus bars B unidirectionally extending in the front-back direction Z1, and connection between the rearmost parallel modules PM may be made via the cross connection member CC extending in a diagonal direction following both the front-back direction Z1 and the left-right direction Z2. Here, the front-back direction Z1 may refer to a direction in which the parallel modules PM are arranged, and the left-right direction Z2 may refer to a direction in which different polarities (i.e., negative and positive electrodes) of each parallel modules PM are arranged and may be perpendicular to the front-back direction Z1.

For example, since opposite polarities of the parallel modules PM arranged in a left-right reverse pattern face each other, the opposite polarities of the parallel modules PM may be connected in series to each other via the bus bars B unidirectionally extending in the front-back direction Z1.

The rearmost parallel modules PM adjacent to each other in the rearmost side of the battery pack, that is, the mth parallel module and the (m−1)th parallel module, are arranged without left-right reversal, and thus electrodes of the same polarity of the rearmost parallel modules PM may face each other. In this case, the cross connecting member CC connecting the rearmost parallel modules PM may extend in the diagonal direction following both the front-back direction Z1 and the left-right direction Z2, and opposite polarities of the rearmost parallel modules PM adjacent to each other, that is, opposite polarities of the mth parallel module PM and the (m−1)th parallel module PM may be connected in series to each other through the cross connection member CC.

The parallel modules PM adjacent to each other at the front end portion of the battery pack, for example, the first and second parallel modules PM, may be arranged without left-right reversal such that the pair of first and second output terminals 121 and 122 may extend outward from opposite left and right sides, and, thus, the parallel modules PM adjacent to each other at the rear end portion of the battery pack, for example, the mth parallel module PM and the (m−1)th parallel module PM, may also be arranged without left-right reversal. That is, the mth parallel module PM and the (m−1)th parallel module PM arranged at the rearmost side of the battery pack may be arranged without left-right reversal such that electrodes of the same polarity may face each other, and opposite polarities of the mth parallel module PM and the (m−1)th parallel module PM may be connected in series to each other through the cross connection member CC extending in the diagonal direction.

Figure 7:
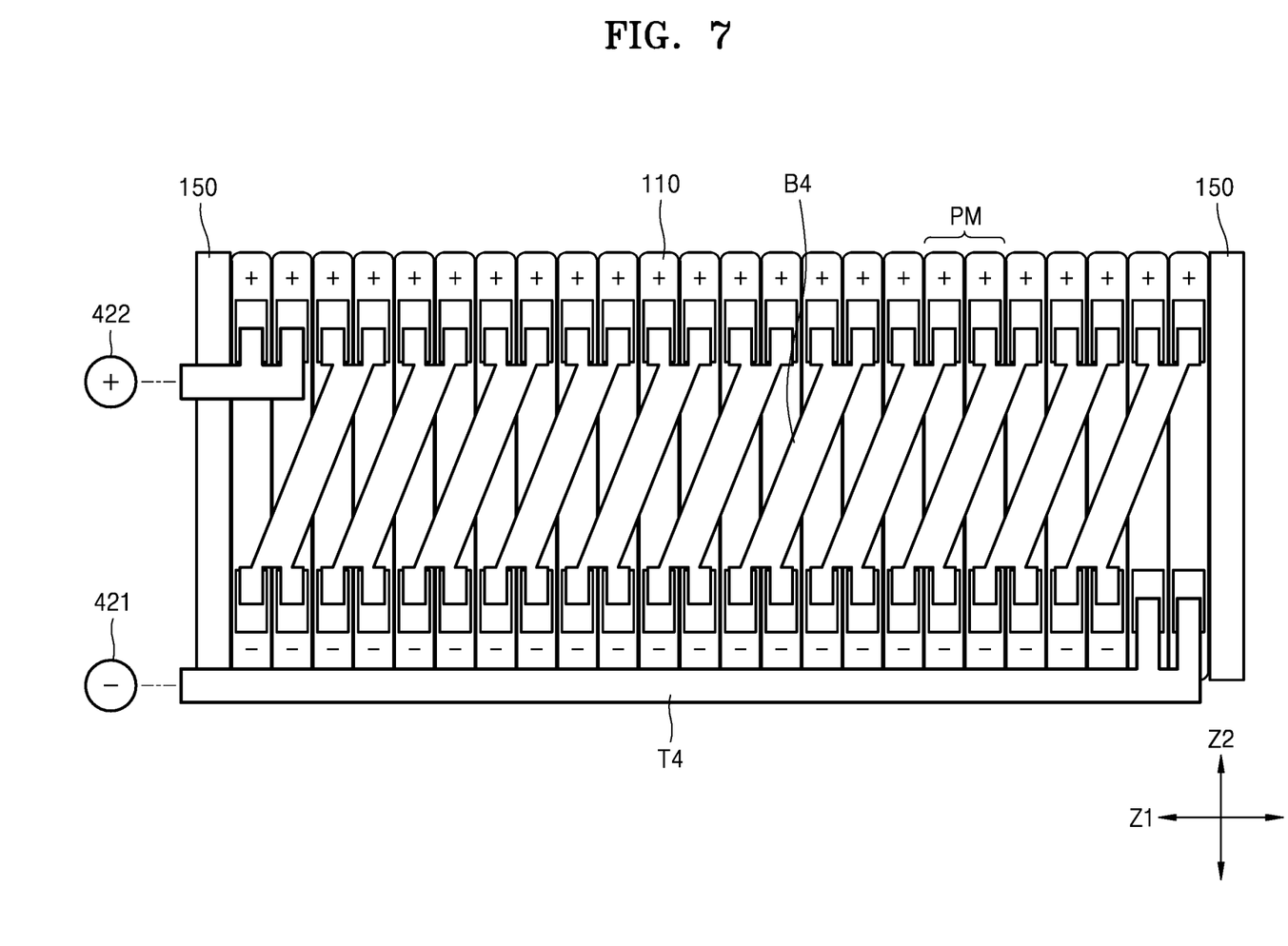
FIG. 7 is a view illustrating a structure of a battery pack according to a third comparative example for comparison with the present disclosure.

FIG. 7 is a view illustrating a structure of a battery pack according to a third comparative example for comparison with the present disclosure. In the third comparative example shown in FIG. 7, the battery pack includes a plurality of parallel modules PM arranged in a front-back direction Z1 with the same orientation without left-right reversal. In addition, the battery pack includes a plurality of bus bars B4 through which the parallel modules PM adjacent to each other are connected in series. In this case, since the parallel modules PM are arranged in the front-back direction Z1 in the same orientation without left-right reversal, electrodes of the same polarity of the parallel modules PM face each other, and, thus, the bus bars B4 extend in a diagonal direction following the front-back direction Z1 and a left-right direction Z2 such that opposite polarities of the parallel modules PM adjacent to each other may be connected in series to each other through the bus bars B4.

Since the bus bars B4 extend in the diagonal direction following both the front-back direction Z1 and the left-right direction Z2, the bus bars B4 extend across upper surfaces of battery cells 110 adjacent to each other. Safety parts such as vents (not shown) for preventing overheating or explosion of the battery cells 110 may be arranged on the upper surfaces of the battery cells 110, and the bus bars B4 placed across the upper surfaces of the battery cells 110 may hinder operations of the safety parts. For example, the bus bars B4 may interrupt discharge of gas from the vents (not shown) provided in the upper surfaces of the battery cells 110, and, thus, discharge of gas pressure that needs to be released (e.g., instantaneously released) may be delayed, thereby causing explosion of the battery pack and hindering safe operations of the battery pack.

In addition, a plurality of members having electrical conductivity may be exposed on the upper surfaces of the battery cells 110. For example, cap plates (not shown) forming the upper surfaces of the battery cells 110, and current-limiting devices (not shown), such as fuses or positive temperature coefficient (PTC) devices, may be placed on upper surface sides of the battery cells 110, and electrical interference may occur between the bus bars B4 crossing the upper surfaces of the battery cells 110 and the cap plates (not shown) or the current-limiting devices (not shown).

In particular, the bus bars B4, extending in the diagonal direction following both the front-back direction Z1 in which the battery cells 110 are arranged and the left-right direction Z2 in which electrodes (negative and positive electrodes) of the battery cells 110 are arranged, are longer than the bus bars B (refer to FIG. 2) extending only in the front-back direction Z1, thereby causing output power loss due to an increase in electrical path and increasing physical and/or electrical interference on the upper surfaces of the battery cells 110.

Referring to FIG. 2, in the battery pack of the present disclosure, the parallel modules PM are alternatively arranged in a left-right reverse pattern such that the parallel modules PM arranged with opposite polarities thereof facing each other may be connected in series to each other through the bus bars B simply unidirectionally extending in the front-back direction Z1. Accordingly, the lengths of the bus bars B crossing the upper surfaces of the battery cells 110 may be shortened, and physical and electrical interference on the upper surfaces of the battery cells 110 may be prevented or substantially prevented.

In the present disclosure, connection between parallel modules PM alternately arranged so as not to be adjacent to each other is made by the bus bars B which simply unidirectionally extend in the front-back direction Z1, and the cross connection member CC for reversing the electrical path extends in the diagonal direction following both the front-back direction Z1 and the left-right direction Z2 such that the parallel modules PM adjacent to each other at the rearmost side of the battery pack, for example, the mth parallel module PM and the (m−1)th parallel module PM may be connected in series to each other through the cross connection member CC.

The parallel modules PM adjacent to each other at the front side of the battery pack, for example, the first and second parallel modules PM, may be arranged without left-right reversal such that the first and second output terminals 121 and 122 may extend outward from opposite left and right sides, and, thus, the parallel modules PM adjacent to each other at the rear side of the battery pack, for example, the mth parallel module PM and the (m−1)th parallel module PM that are arranged at the rearmost side of the battery pack, may also be arranged without left-right reversal such that electrodes of the same polarity may face each other and may be connected in series to each other through the cross connection member CC extending in the diagonal direction.

According to the present disclosure, only the cross connection member CC crosses upper surfaces of battery cells 110 in the diagonal direction, and the other bus bars B and the first and second terminal connection members T1 and T2 simply unidirectionally extend in the front-back direction Z1, thereby decreasing physical and electrical interference on the upper surfaces of the battery cells 110 that may occur according to electrical connection.

In the third comparative example shown in FIG. 7, a terminal connection member T4 extends across the length of the battery pack from a rearmost parallel module PM to a front side of the battery pack to place first and second output terminals 421 and 422 of the battery pack at the front side of the battery pack. The terminal connection member T4 extending across the length of the battery pack elongates the electrical path of the first output terminal 421 to cause output power loss according to electrical resistance, and because of difficulty in fixing and insulating the terminal connection member T4 extending across the length of the battery pack, the terminal connection member T4 may complicate the entire structure of the battery pack, make the battery pack vulnerable to vibrations and shocks, and cause defects of the battery pack.

In the battery pack of the embodiment shown in FIG. 2, the first and second output terminals 121 and 122 extend outward from the two parallel modules PM adjacent to each other at the front end portion of the battery pack, i.e., from the first and second parallel modules PM. Thus, the battery pack may be easily electrically connected to a device (e.g., a set device) (not shown) in which the battery pack will be installed, and electrical paths for forming the output terminals 120 are shortened such that the first and second terminal connection members T1 and T2 may be simply fixed and insulated, and the battery pack may be durable against vibrations and shocks. In addition, since the first and second terminal connection members T1 and T2 have short paths and are fixed and insulated by a simple structure, the battery pack may have improved spatial efficiency and a compact structure compared to other battery packs having the same energy density.

Figure 8:
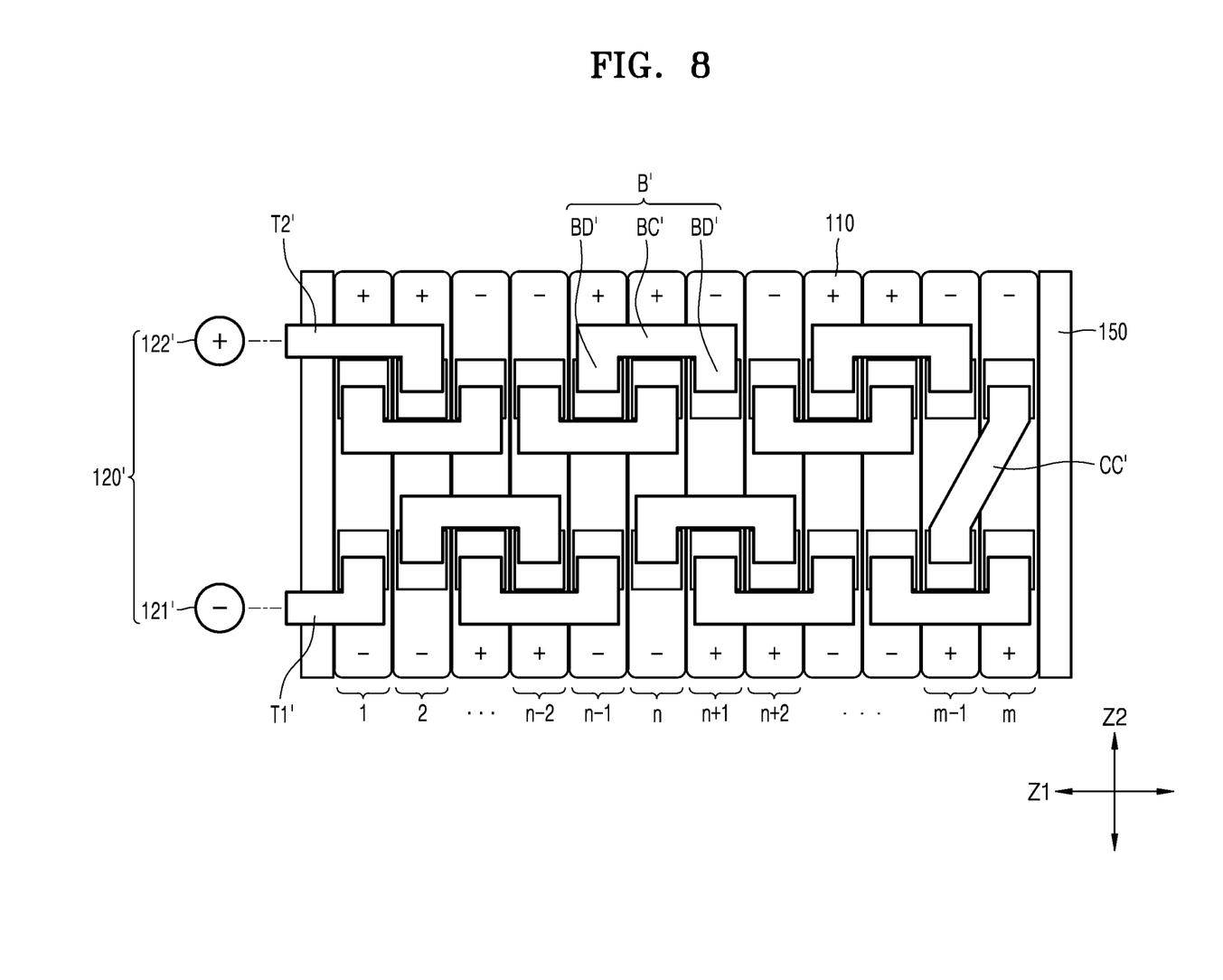
FIG. 8 is a view illustrating electrical connection of a battery pack according to another embodiment.

FIG. 8 is a view illustrating electrical connection of a battery pack according to another embodiment. Referring to FIG. 8, the battery pack may include a plurality of battery cells 110 arranged in a row in a front-back direction Z1.

The battery pack may include bus bars B' to electrically connect the battery cells 110. Each of the bus bars B' may include branches BD' for forming contacts with battery cells 110 and a connection portion BC' connecting the branches BD' to each other.

For example, the bus bars B' may connect opposite polarities of the battery cells 110 in series to each other. As described later herein, the bus bars B' may electrically connect battery cells 110 alternately arranged so as not to be adjacent to each other.

The battery pack of the present embodiment may include series connection between battery cells 110 that are not adjacent to each other in the front-back direction Z1. The battery pack of the present embodiment may include a plurality of battery cells 110, that is, first, second, . . . , (n−2)th, (n−1)th, nth, (n+1)th, (n+2)th, . . . , (m−1)th, and mth battery cells 110 arranged in the front-back direction Z1, and, in this case, the nth battery cell 110 is not connected to the (n−1)th battery cell 110 which is directly ahead of the nth battery cell 110. Similarly, the nth battery cell 110 is not connected to the (n+1)th battery cell 110 which is directly behind the nth battery cell 110.

In the forward direction, the nth battery cell 110 is connected to the (n−2)th battery cell 110 with the (n−1)th battery cell 110 therebetween. In the backward direction, the nth battery cell 110 is connected to the (n+2)th battery cell 110 with the (n+1)th battery cell 110 therebetween. For example, the nth battery cell 110 is connected in series to the (n−2)th battery cell 110 in the forward direction by connecting electrodes of opposite polarities to each other, and is connected in series to the (n+2)th battery cell 110 in the backward direction by connecting electrodes of opposite polarities to each other.

For example, in the nth battery cell 110 and the (n−1)th battery cell 110 that are adjacent to each other, a bus bar B' connected to the nth battery cell 110 and a bus bar B' connected to the (n−1)th battery cell 110 are different bus bars that are spaced apart from each other and have no contact therebetween. In other words, in the nth battery cell 110 and the (n+1)th battery cell 110 that are adjacent to each other, the bus bar B' connected to the nth battery cell 110 and a bus bar B' connected to the (n+1)th battery cell 110 are different bus bars that are spaced apart from each other and have no contact therebetween.

The (n−1)th battery cell 110 and the (n+1)th battery cell 110 that are spaced apart from each other with the nth battery cell 110 therebetween are connected in series to each other through the bus bar B', and the bus bar B' connecting the (n−1)th battery cell 110 and the (n+1)th battery cell 110 to each other may have a comb structure to engage (or align) with the bus bar B' connected to the nth battery cell 110.

The battery pack of the present embodiment forms series connection between battery cells 110 that are alternately spaced apart from each other so as not to be adjacent to each other. To form this series connection, alternately spaced battery cells 110 may be arranged in a pattern in which the battery cells 110 are reversed in a left-right direction Z2 such that opposite polarities thereof may face each other. For example, the nth battery cell 110 and the (n−2)th battery cell 110 that are connected in series to each other are left-right reversed relative to each other in the left-right direction Z2 such that opposite polarities thereof may face each other, and the nth battery cell 110 and the (n+2)th battery cell 110 that are connected in series to each other are left-right reversed relative to each other in the left-right direction Z2 such that opposite polarities thereof may face each other.

As described above, to form a reverse pattern in which the battery cells 110 are alternately arranged in the front-back direction Z1 with left-right reverse orientations, left-right reversal in the left-right direction Z2 may occur at every two battery cells 110 adjacent to each other in the front-back direction Z1. As shown in FIG. 8, the pair of the nth battery cell 110 and the (n−1)th battery cell 110 adjacent to each other are arranged without left-right reversal such that electrodes of the same polarity may face each other, and the pair of the (n+1)th battery cell 110 and the (n+2)th battery cell 110 adjacent to each other are arranged without left-right reversal such that electrodes of the same polarity may face each other. In this case, the pair of the nth battery cell 110 and the (n−1)th battery cell 110 adjacent to each other are left-right reversed relative to the pair of the (n+1)th battery cell 110 and the (n+2)th battery cell 110 adjacent to each other. As described above, left-right reversal in the left-right direction Z2 occurs at every pair of two battery cells 110 adjacent to each other in the front-back direction Z1 such that opposite polarities of battery cells 110 which are alternately arranged so as not to be adjacent to each other may face each other, and since battery cells 110 alternately arranged so as not to be adjacent to each other are connected through bus bars B' simply unidirectionally extending in the front-back direction Z1, series connection may be easily realized.

The battery pack of the present embodiment may include a plurality of battery cells 110, that is, first, second, . . . , (n−2)th, (n−1)th, nth, (n+1)th, (n+2)th, . . . , (m−1)th, and mth battery cells 110 arranged in the front-back direction Z1, and, in this case, output terminals 120' of the battery pack may extend outward respectively from the first and second battery cells 110 arranged at a front end portion of the battery pack. That is, since first and second output terminals 121' and 122' extend outward from two battery cells 110 adjacent to each other at the front end portion of the battery pack, that is, from the first and second battery cells 110, the pair of first and second output terminals 121' and 122' may be adjacent to each other at the front side of the battery pack, and this structure may facilitate electrical connection between the battery pack and a device (e.g., a set device) (not shown) to which the battery pack is attached. In addition, since the first and second output terminals 121' and 122' extend outward from the two battery cells 110, that is, from the first and second battery cells 110 that are adjacent to each other at the front end portion of the battery pack, electrical paths for forming the output terminals 120' may be shortened.

The first and second battery cells 110 adjacent to each other at the front end portion of the battery pack may be arranged without left-right reversal such that the first and second output terminals 121' and 122' having opposite polarities may be placed at opposite left and right sides without polarity interference. As described above, since the first and second output terminals 121' and 122', and different polarities (e.g., negative and positive electrodes) of the first and second battery cells 110 connected to the first and second output terminals 121' and 122' are arranged at the left and right sides, the first and second output terminals 121' and 122' and the first and second battery cells 110 may be easily electrically connected to each other via the pair of first and second terminal connection members T1' and T2' simply unidirectionally extending in the front-back direction Z1 from the different polarities (e.g., negative and positive electrodes) of the first and second battery cells 110.

Since the pair of first and second output terminals 121' and 122' are both placed at the front side of the battery pack, a cross connection member CC' may be placed at a rear side of the battery pack to reverse an electrical path. Battery cells 110 adjacent to each other at a rear end portion of the battery pack, that is, the rearmost mth battery cell 110 and (m−1)th battery cell 110, may be connected in series to each other through the cross connection member CC'.

For example, connection between battery cells 110 alternately arranged so as not to be adjacent to each other may be made via bus bars B' unidirectionally extending in the front-back direction Z1, and connection between battery cells 110 adjacent to each other at the rearmost side of the battery pack, that is, the rearmost mth battery cell 110 and (m−1)th battery cell 110 may be made via the cross connection member CC' extending in a diagonal direction following both the front-back direction Z1 and the left-right direction Z2.

The battery cells 110 adjacent to each other at the front side of the battery pack, for example, the first and second battery cells 110, may be arranged without left-right reversal such that the first and second output terminals 121' and 122' may extend outward from opposite left and right sides, and, thus, the battery cells 110 adjacent to each other at the rear side of the battery pack, for example, the mth battery cell 110 and the (m−1)th battery cell 110 that are arranged at the rearmost side of the battery pack, may also be arranged without left-right reversal such that electrodes of the same polarity may face each other and may be connected in series to each other through the cross connection member CC' extending in the diagonal direction.

As described above, according to the battery pack of one or more of the above embodiments, the output terminals having different polarities may be provided at adjacent positions. Therefore, the battery pack may be easily electrically connected to a device (e.g., a set device). In addition, since the electrical paths of the output terminals are shortened, the battery pack may have improved electrical output power and spatial efficiency by a simple structure, and may be durable against vibrations and shocks.

It is to be understood that embodiments described herein should be considered in a descriptive sense and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as set forth by the following claims.

What is claimed is:

1. A battery pack comprising:
    a plurality of parallel modules arranged in an arrangement direction; and
    a bus bar through which different polarities of parallel modules of the plurality of parallel modules that are not adjacent to each other in the arrangement direction are connected in series to each other,
    wherein the bus bar connects the parallel modules that are alternately spaced apart from each other so as not to be adjacent to each other in the arrangement direction, and the bus bar comprises a plurality of bus bars each connecting a pair of parallel modules of the plurality of parallel modules that are alternately spaced apart from each other in the arrangement direction.

2. The battery pack of claim 1, wherein the plurality of parallel modules comprises first, second, . . . , (n−2)th, (n−1)th, nth, (n+1)th, (n+2)th, . . . , (m−1)th, and mth parallel modules in the arrangement direction,
    wherein the bus bar comprises:
    a front bus bar connecting the (n−2)th parallel module and the nth parallel module to each other; and
    a rear bus bar connecting the (n−1)th parallel module and the (n+1)th parallel module to each other.

3. The battery pack of claim 2, wherein the front bus bar and the rear bus bar have a comb structure to engage with each other.

4. The battery pack of claim 3, wherein the front bus bar comprises a connection portion extending in the arrangement direction and pairs of branches protruding from the connection portion to form contacts with the (n−2)th parallel module and the nth parallel module,
    the rear bus bar comprises a connection portion extending in the arrangement direction and pairs of branches protruding from the connection portion to form contacts with the (n−1)th parallel module and the (n+1)th parallel module, and
    the pairs of branches of the front bus bar and the pairs of branches of the rear bus bar have a comb structure to engage with each other.

5. The battery pack of claim 1, wherein the parallel modules have different polarities arranged in a left-right direction, and
    alternately arranged parallel modules connected through the bus bar are arranged in a left-right reverse pattern such that opposite polarities of the alternately arranged parallel modules face each other.

6. The battery pack of claim 5, wherein the parallel modules are arranged in the arrangement direction in a left-right reverse pattern in such a manner that every pair of the plurality of parallel modules adjacent to each other in the arrangement direction is left-right reversed relative to adjacent pairs of the plurality of parallel modules.

7. The battery pack of claim 6, wherein a pair of parallel modules of the plurality of parallel modules in the arrangement direction is arranged without left-right reversal, and
    the pair of parallel modules and another pair of parallel modules of the plurality of parallel modules adjacent to the pair of parallel modules are left-right reversed relative to each other.

8. The battery pack of claim 1, further comprising first and second output terminals having different polarities, both the first and second output terminals extending outward from one of a front end portion and a rear end portion of the battery pack in the arrangement direction.

9. The battery pack of claim 1, wherein the plurality of parallel modules comprises first, second, . . . , (m−1)th, and mth parallel modules in the arrangement direction, and different polarities of the mth parallel module and the (m−1)th parallel module are connected in series to each other through a cross connection member extending in a diagonal direction.

10. The battery pack of claim 9, wherein the (m−1)th parallel module and the mth parallel module connected to each other through the cross connection member are arranged without left-right reversal such that electrodes of the same polarity of the (m−1)th parallel module and the mth parallel module face each other.

11. The battery pack of claim 9, wherein the parallel modules have different polarities arranged in a left-right direction, and the cross connection member extends in the diagonal direction following both the arrangement direction and the left-right direction.

12. A battery pack comprising:

a plurality of parallel modules arranged in an arrangement direction; and a bus bar through which different polarities of parallel modules of the plurality of parallel modules that are not adjacent to each other in the arrangement direction are connected in series to each other, wherein each of the parallel modules comprises battery cells of which electrodes of the same polarity are connected in parallel to each other.

13. The battery pack of claim 12, wherein the electrodes of the same polarity of the battery cells included in each of the parallel modules are connected in parallel to each other through the bus bar, and electrodes of different polarities of different parallel modules of the plurality of parallel modules are connected in series to each other through the bus bar.

14. The battery pack of claim 13, wherein the bus bar connects a front parallel module and a rear parallel module of the plurality of parallel modules in the arrangement direction, wherein the bus bar comprises:

a group of front branches respectively forming contacts with the battery cells of the front parallel module;

a group of rear branches respectively forming contacts with the battery cells of the rear parallel module; and a connection portion unidirectionally extending in the arrangement direction while connecting the group of front branches respectively to the group of rear branches.

15. A battery pack comprising:

a plurality of parallel modules arranged in an arrangement direction;

a bus bar through which different polarities of parallel modules of the plurality of parallel modules that are not adjacent to each other in the arrangement direction are connected in series to each other; and first and second output terminals having different polarities, both the first and second output terminals extending outward from one of a front end portion and a rear end portion of the battery pack in the arrangement direction, wherein the plurality of parallel modules comprises first, second, . . . , (m−1)th, and mth parallel modules in the arrangement direction, and the first and second output terminals extend outward from the first and second parallel modules.

16. The battery pack of claim 15, further comprising first and second terminal connection members unidirectionally extending in the arrangement direction to connect the first and second output terminals respectively to the first and second parallel modules.

17. The battery pack of claim 15, wherein the first and second parallel modules from which the first and second output terminals extend outward are arranged without left-right reversal such that electrodes of the same polarity of the first and second parallel modules face each other.

18. A battery pack comprising:

a plurality of battery cells arranged in an arrangement direction; and a bus bar through which different polarities of battery cells of the plurality of battery cells that are alternately spaced apart from each other so as not to be adjacent to each other in the arrangement direction are connected in series to each other, wherein the bus bar is connected to the battery cells at a same side of the plurality of battery cells in a left-right direction that is perpendicular to the arrangement direction.

* * * * *